(12) United States Patent
Yang et al.

(10) Patent No.: US 11,259,199 B2
(45) Date of Patent: Feb. 22, 2022

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 205 days.

(21) Appl. No.: 16/691,162

(22) Filed: Nov. 21, 2019

(65) Prior Publication Data

US 2020/0092743 A1 Mar. 19, 2020

Related U.S. Application Data

(63) Continuation of application No. PCT/CN2017/088485, filed on Jun. 15, 2017.

(51) Int. Cl.
*H04W 24/10* (2009.01)
*H04W 48/18* (2009.01)

(52) U.S. Cl.
CPC .......... *H04W 24/10* (2013.01); *H04W 48/18* (2013.01)

(58) Field of Classification Search
CPC .............................. H04W 24/10; H04W 48/18
See application file for complete search history.

(56) References Cited

U.S. PATENT DOCUMENTS

2012/0099632 A1* 4/2012 Bury ................... H04J 11/0079
375/224
2013/0344869 A1* 12/2013 Yamada ............ H04W 36/0094
455/436

FOREIGN PATENT DOCUMENTS

| CN | 102340888 | 2/2012 |
| CN | 106162729 | 11/2016 |
| CN | 106233772 | 12/2016 |
| EP | 3132633 | 2/2017 |
| RU | 2537692 | 1/2015 |
| WO | 2016064654 | 4/2016 |

OTHER PUBLICATIONS

LG Electronics, "Discussion on dual connectivity between LTE and NR", 3GPP Draft, R1-1704924 LTE NR DC, 3rd Generation Partnership Project (3GPP), 3GPP TSG RAN WG1 Meeting #88bis, Apr. 7, 2017.
European Patent Office, Search Report for EP Application No. 17913519.9, dated Mar. 9, 2020.
WIPO, ISR for PCT/CN2017/088485, Oct. 27, 2017.
CIPO, Office Action for CA Application No. 3064135, dated Jan. 18, 2021.

(Continued)

*Primary Examiner* — Natasha W Cosme
(74) *Attorney, Agent, or Firm* — Hodgson Russ LLP

(57) ABSTRACT

The embodiment of the present disclosure provides a wireless communication method and a wireless communication device. The method includes: the primary service node serving the terminal device in a first network sending first information to the terminal device, wherein the first information is used to indicate the terminal device to perform measurement and/or measurement result reporting on a secondary service node in a second network.

17 Claims, 5 Drawing Sheets

(56) References Cited

OTHER PUBLICATIONS

IPIN, Office Action for IN Application No. 201917046788, dated Feb. 16, 2021.
Huawei et al., "Inter-RAT mobility events and measurements," 3GPP TSG-RAN WG2 Meeting #98, R2-1704879, May 2017, 2 pages.
Huawei et al., "Measurement reporting for Idle mode RS and CSI-RS," 3GPP TSG-RAN WG2 Meeting #98, R2-1704876, May 2017, 2 pages.
Intel Corporation, "SS block identifier reporting," 3GPP TSG RAN WG2 Meeting #98, R2-1704766, May 2017, 3 pages.
Oppo, "Discussion on inter-RAT measurement event reports," 3GPP TSG-RAN2#98, R2-1704554, May 2017, 3 pages.
IPOS, Office Action for SG Application No. 11201910858U, dated Nov. 10, 2020.
FSIP, Office Action for RU Application No. 2019141053/07, dated Aug. 7, 2020.
CIPO, Second Office Action for CA Application No. 3064135, dated Oct. 22, 2021.
EPO, First Office Action for EP Application No. 17913519.9, dated Nov. 3, 2021.

\* cited by examiner

WIRELESS COMMUNICATION METHOD AND DEVICE

CROSS-REFERENCE TO RELATED APPLICATION

This application is a continuation of International Application No. PCT/CN2017/088485, filed on Jun. 15, 2017, the entire disclosure of which is incorporated herein by reference.

TECHNICAL FIELD

The present disclosure relates to the field of communication technology, in particular, relates to a wireless communication method and a wireless communication device.

BACKGROUND

In a future communication network, in order to ensure continuity in movement of terminals, enhance cooperation between networks, and increase transmission rates of terminals, it is necessary to coordinate between multiple networks to perform dual-way connection or even multiple-way connection, thereby ensuring transmission performance of the terminals.

In a dual-way connection or multiple-way connection process, there is one primary service node and one or more secondary service nodes, and the primary service node can implement main control functions for terminals, including functions such as accessing, paging, and adding/deleting/modifying an secondary service node, carrier configuration and measurement reporting configuration. The secondary service node mainly implements data transmission to and from the terminals.

SUMMARY

Embodiments of the present application provides a wireless communication method and a wireless communication device, and a terminal device performs measurement and/or measurement result reporting on the secondary service node in the network according to the indication of the primary service node.

In a first aspect, there is provided a wireless communication method, including:

sending, by a primary service node serving a terminal device in a first network, first information to the terminal device, wherein the first information is used to indicate the terminal device to perform measurement and/or measurement result reporting on a secondary service node in a second network.

In connection with the first aspect, in a possible implementation of the first aspect, the secondary service node corresponding to the single measurement and/or the single measurement result reporting indicated by the first information includes at least two secondary service nodes.

In connection with the first aspect and any of the above possible implementations, in another possible implementation of the first aspect, the at least two secondary service nodes include a first secondary service node and a second secondary service node; and the first secondary service node is a node that is currently serving the terminal device, and the second secondary service node is a node that is not currently serving the terminal device.

In connection with the first aspect and any of the above possible implementations, in another possible implementation of the first aspect, the first information is further used to indicate to the terminal device a first event for triggering the measurement result reporting; and the first event is used to indicate to perform measurement result reporting when a comparison result between measurement results of the at least two secondary service nodes satisfies a triggering condition, and/or, to perform measurement result reporting when comparison results respectively between the measurement results of the at least two secondary service nodes and predetermined values satisfy a triggering condition.

In connection with the first aspect and any of the above possible implementations, in another possible implementation of the first aspect, the first event is:

a channel quality of a first cell of the second secondary service node being better than a channel quality of a second cell of the first secondary service node by at least a first predetermined value.

In connection with the first aspect and any of the above possible implementations, in another possible implementation of the first aspect, the first cell includes at least one cell in which the second secondary service node being able to provide service for the terminal device; and the second cell includes all secondary service cells or the secondary service cell with the best channel quality in which the first secondary service node providing service for the terminal device.

In connection with the first aspect and any of the above possible implementations, in another possible implementation of the first aspect, the first cell includes at least one cell in which the second secondary service node being able to provide service for the terminal device; and the second cell includes all cells, a cell having a channel quality, all service cell, the secondary service cell with the best channel quality, a primary service cell or a secondary service cell in which the first secondary service node providing service for the terminal device.

In connection with the first aspect and any of the above possible implementations, in another possible implementation of the first aspect, the first event is:

a channel quality of a third cell of the first secondary service node being worse than or equal to a second predetermined value, and a channel quality of a fourth cell of the second secondary service node being better than or equal to a third predetermined value.

In connection with the first aspect and any of the above possible implementations, in another possible implementation of the first aspect, the third cell is all cells, a cell with the best channel quality, all service cells, a service cell with the best channel quality, a primary service cell or a secondary service cell of the first secondary service node; and the fourth cell is at least one cell in which the second secondary service node being able to provide service for the terminal device.

In connection with the first aspect and any of the above possible implementations, in another possible implementation of the first aspect, the first information indicates that the secondary service node that needs to be measured includes a third secondary service node, wherein the third secondary service node is a node that is currently serving the terminal device;

the first information is further used to indicate to the terminal device a second event for triggering the measurement result reporting; and the second event is used to indicate that a channel quality of a service cell of the third secondary service node is better than or equal to a fourth predetermined value.

In connection with the first aspect and any of the above possible implementations, in another possible implementation of the first aspect, the first information indicates that the secondary service node on which the measurement and/or the measurement result reporting needs to be performed includes a fourth secondary service node, wherein the fourth secondary service node is a node that is currently serving the terminal device;

the first information is further used to indicate to the terminal device a third event for triggering the measurement result reporting; and the third event is used to indicate that a channel quality of a fifth cell of the fourth service node is worse than or equal to a fifth predetermined value.

In connection with the first aspect and any of the above possible implementations, in another possible implementation of the first aspect, the fifth cell is all cells, a cell with the best channel quality, all service cells or a service cell with the best channel quality of the fourth secondary service node.

In connection with the first aspect and any of the above possible implementations, in another possible implementation of the first aspect, the first information includes a first field, wherein the first field identifies a network to which the secondary service node corresponding to the first information belongs and/or a number of the secondary service nodes corresponding to the first information.

In connection with the first aspect and any of the above possible implementations, in another possible implementation of the first aspect, the first information includes a second field, and the second field identifies a network to which the secondary service node corresponding to the measurement and/or the measurement result reporting belongs and/or a number of secondary service nodes that need to be measured.

In connection with the first aspect and any of the above possible implementations, in another possible implementation of the first aspect, the first information carries at least one of a frequency identifier, a node identifier ID, a cell ID, or a network type of the secondary service node.

In connection with the first aspect and any of the above possible implementations, in another possible implementation of the first aspect, a network type of the first network is different from a network type of the second network.

In connection with the first aspect and any of the above possible implementations, in another possible implementation of the first aspect, the method further includes:

receiving, by the primary service node, a measurement report sent by the terminal device;

performing, by the primary service node, secondary service node configuration for the terminal device according to the measurement report, wherein the configuration includes adding, modifying, and deleting the secondary service node.

In a second aspect, there is provided a wireless communication method, including:

receiving, by a terminal device, first information sent by a primary service node serving the terminal device in a first network, wherein the first information is used to indicate the terminal device to perform measurement and/or measurement result reporting on a secondary service node in a second network; and performing the measurement and/or measurement result reporting on the secondary service node in the second network according to the first information.

In connection with the second aspect, in a possible implementation of the second aspect, the secondary service node corresponding to the single measurement and/or the single measurement result reporting indicated by the first information includes at least two secondary service nodes.

In connection with the second aspect and any of the above possible implementations, in another possible implementation of the second aspect, the at least two secondary service nodes include a first secondary service node and a second secondary service node; and the first secondary service node is a node that is currently serving the terminal device, and the second secondary service node is a node that is not currently serving the terminal device.

In connection with the second aspect and any of the above possible implementations, in another possible implementation of the second aspect, the first information is further used to indicate to the terminal device a first event for triggering the measurement result reporting; and the first event is used to indicate to perform measurement result reporting when a comparison result between the measurement results of the at least two secondary service nodes satisfies a triggering condition, and/or, to perform measurement result reporting when comparison results respectively between the measurement results of the at least two secondary service nodes and predetermined values satisfy a triggering condition.

In connection with the second aspect and any of the above possible implementations, in another possible implementation of the second aspect, the first event is:

a channel quality of a first cell of the second secondary service node being better than a channel quality of a second cell of the first secondary service node by at least a first predetermined value.

In connection with the second aspect and any of the above possible implementations, in another possible implementation of the second aspect, the first cell includes at least one cell in which the second secondary service node being able to provide service for the terminal device; and the second cell includes all secondary service cells or the secondary service cell with the best channel quality in which the first secondary service node providing service for the terminal device.

In connection with the second aspect and any of the above possible implementations, in another possible implementation of the second aspect, the first cell includes at least one cell in which the second secondary service node being able to provide service for the terminal device; and the second cell includes all cells, a cell having a channel quality, all service cell, the secondary service cell with the best channel quality, a primary service cell or a secondary service cell in which the first secondary service node providing service for the terminal device.

In connection with the second aspect and any of the above possible implementations, in another possible implementation of the second aspect, the first event is:

a channel quality of a third cell of the first secondary service node being worse than or equal to a second predetermined value, and a channel quality of a fourth cell of the second secondary service node being better than or equal to a third predetermined value.

In connection with the second aspect and any of the above possible implementations, in another possible implementation of the second aspect, the third cell is all cells, a cell with the best channel quality, all service cells, a service cell with the best channel quality, a primary service cell or a secondary service cell of the first secondary service node; and the fourth cell is at least one cell in which the second secondary service node being able to provide service for the terminal device.

In connection with the second aspect and any of the above possible implementations, in another possible implementation of the second aspect, the first information indicates that the secondary service node that needs to be measured includes a third service node, wherein the third service node is a node that is currently serving the terminal device;

the first information is further used to indicate to the terminal device a second event for triggering the measurement result reporting; and the second event is used to indicate that a channel quality of a service cell of the third secondary service node is better than or equal to a fourth predetermined value.

In connection with the second aspect and any of the above possible implementations, in another possible implementation of the second aspect, the first information indicates that the secondary service node on which the measurement and/or the measurement result reporting needs to be performed includes a fourth secondary service node, wherein the fourth secondary service node is a node that is currently serving the terminal device;

the first information is further used to indicate to the terminal device a third event for triggering the measurement result reporting; and the third event is used to indicate that a channel quality of a fifth cell of the fourth secondary service node is worse than or equal to a fifth predetermined value.

In connection with the second aspect and any of the above possible implementations, in another possible implementation of the second aspect, the fifth cell is all cells, a cell with the best channel quality, all service cells or a service cell with the best channel quality of the fourth secondary service node.

In connection with the second aspect and any of the above possible implementations, in another possible implementation of the second aspect, the first information includes a first field, and the first field identifies a network to which the secondary service node corresponding to the first information belongs and/or a number of the secondary service nodes corresponding to the first information.

In connection with the second aspect and any of the above possible implementations, in another possible implementation of the second aspect, the first information includes a second field, and the second field identifies a network to which the secondary service node corresponding to the measurement and/or the measurement result reporting belongs and/or a number of secondary service nodes that need to be measured.

In connection with the second aspect and any of the above possible implementations, in another possible implementation of the second aspect, the first information carries at least one of a frequency identifier, a node identifier ID, a cell ID, or a network type of the secondary service node.

In connection with the second aspect and any of the above possible implementations, in another possible implementation of the second aspect, a network type of the first network is different from a network type of the second network.

In a third aspect, a service node is provided for performing any of the above first aspect or any of the possible implementations of the first aspect. In particular, the service node includes functional modules for performing the method of the first aspect or any of the possible implementations of the first aspect described above.

In a fourth aspect, a terminal device is provided for performing any of the above second aspect or any of the possible implementations of the second aspect. In particular, the terminal device includes functional modules for performing the method of the second aspect or any of the possible implementations of the second aspect described above.

In a fifth aspect, a service node is provided, including a processor, a memory, and a transceiver. The processor, the memory, and the transceiver communicate with each other through an internal connection path to transfer control and/or data signals, such that the service node performs the method of the first aspect or any of the possible implementations of the first aspect described above.

In a sixth aspect, a terminal device is provided, including a processor, a memory, and a transceiver. The processor, the memory, and the transceiver communicate with each other through an internal connection path to transfer control and/or data signals, such that the service node performs the method of the second aspect or any of the possible implementations of the second aspect described above.

In a seventh aspect, a computer readable medium is provided for storing a computer program, the computer program including instructions for performing any of the above methods or any possible implementations.

In an eighth aspect, there is provided a computer program product including instructions, when being executed on a computer, causes the computer to perform any of the above methods or method in any possible implementations.

BRIEF DESCRIPTION OF THE DRAWINGS

In order to more clearly illustrate the technical solutions of the embodiments of the present application, the drawings to be used in the embodiments or the prior art description will be briefly described below. Apparently, the drawings in the following description are only some embodiments of the present application. Those skilled in the art can obtain other drawings according to the drawings without any creative work.

DETAILED DESCRIPTION

The technical solutions in the embodiments of the present application are described in conjunction with the accompanying drawings in the embodiments of the present application. It is apparent that the described embodiments are a part of the embodiments of the present application, and not all of the embodiments. All other embodiments obtained by a person of ordinary skill in the art based on the embodiments of the present application without paying creative work all fall in the protection scope of the present application.

The technical solution of the embodiment of the present application can be applied to various communication systems, for example, Global System of Mobile communication ("GSM") system, Code Division Multiple Access ("CDMA") system, Wideband Code Division Multiple Access ("WCDMA") system, General Packet Radio Service ("GPRS"), Long Term Evolution ("LTE") system, LTE Frequency Division Duplex ("FDD") system, LTE Time Division Duplex ("TDD"), Universal Mobile Telecommunication System ("UMTS"), Worldwide Interoperability for Microwave Access ("WiMAX") communication system, or a future 5G system (also known as a New Radio (NR) system).

Figure 1:
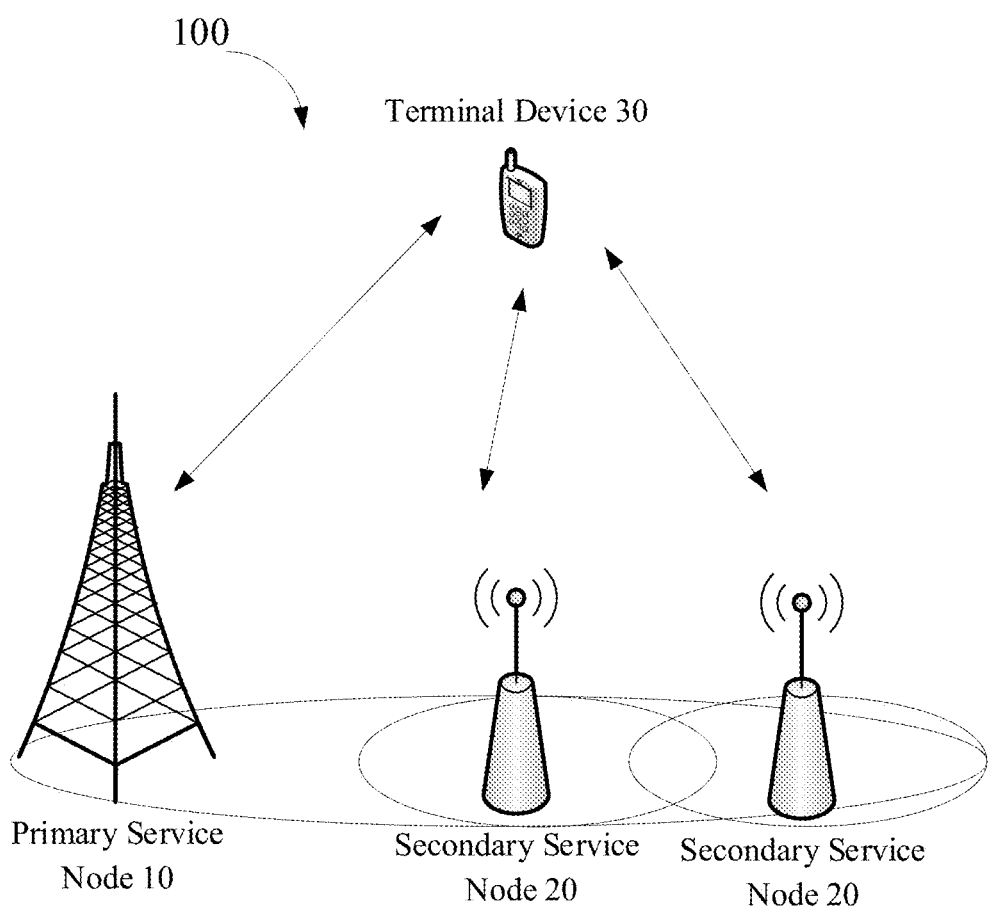
FIG. 1 is a schematic diagram of a wireless communication system according to an embodiment of the present application.

FIG. 1 is a schematic flow diagram of a wireless communication system 100 according to an embodiment of the present application. The system shown in FIG. 1 includes a primary service node 10, a secondary service node 20, and a terminal device 30.

The primary service node 10 can implement the main control functions for the terminal device 30, including accessing, paging, adding/deleting/modifying an secondary service node 20, carrier configuration, measurement reporting configuration, and the like; and the secondary service node 20 can implement data transmission to and from the terminal device 30.

In addition, since the terminal device 30 needs to perform movement within or between the secondary service nodes, the primary service node can perform configuration of the measurement and/or measurement result reporting on the terminal device 30.

Also, when the primary service node 10 adds, deletes, or modifies the secondary service node 20 for the terminal device 30, the primary service node 10 configures the terminal device 30 to perform measurement and/or measurement result reporting on the secondary service node 20, so that the terminal device 30 can perform measurement on the secondary service node 20 and report the measurement result to the primary service node 10, to assist the primary service node 10 in performing the configuration operation of the secondary service node.

In the embodiment of the present application, the primary service node 10 or the secondary service node 20 can be a device that is in communication with a terminal device. The primary service node 10 or the secondary service node 20 can provide communication coverage for a particular geographic area and can communicate with a terminal device (e.g., UE) located within the coverage area. In at least one embodiment, the primary service node 10 or the secondary service node 20 can be a base station (Base Transceiver Station, BTS) in a GSM system or a CDMA system, or can be a base station (NodeB, NB) in a WCDMA system, or can be an evolved base station (Evolutional Node B, eNB or eNodeB) in an LTE system, or a wireless controller in a Cloud Radio Access Network (CRAN), or can be a relay station, an access point, an in-vehicle device, a wearable device, a network side device in a future 5G network or a network device in a Public Land Mobile Network (PLMN) evolved in the future, and the like.

In the embodiment of the present application, the terminal device 30 can be mobile or fixed. In at least one embodiment, the terminal device 30 can refer to an access terminal, a user equipment (User Equipment, UE), a subscriber unit, a subscriber station, a mobile station, a mobile platform, a remote station, a remote terminal, a mobile device, a user terminal, a terminal, a wireless communication device, a user agent, or a user device. The access terminal can be a cellular phone, a cordless phone, a Session Initiation Protocol (SIP) phone, a Wireless Local Loop (WLL) station, a Personal Digital Assistant (PDA), a handheld device with wireless communication functional, a computing device or other processing device connected to a wireless modem, an in-vehicle device, a wearable device, a terminal device in future 5G networks, or a terminal device in future evolved PLMNs, and the like.

In at least one embodiment, the 5G system or network can also be referred to as a New Radio (NR) system or network.

In at least one embodiment, the wireless communication system 100 can further include other network entities, such as a network controller, a mobility management entity, and the like, which the embodiment of the present application does not limit.

It should be understood that the terms "system" and "network" are used interchangeably herein. The term "and/or" herein only describes an association between associated objects, indicating that there can be three relationships. For example, A and/or B can indicate three situations that: respectively only A exists, both A and B exist, and only B exists. In addition, the character "/" herein generally indicates that the associated objects in the context are in an "or" relationship.

Figure 2:
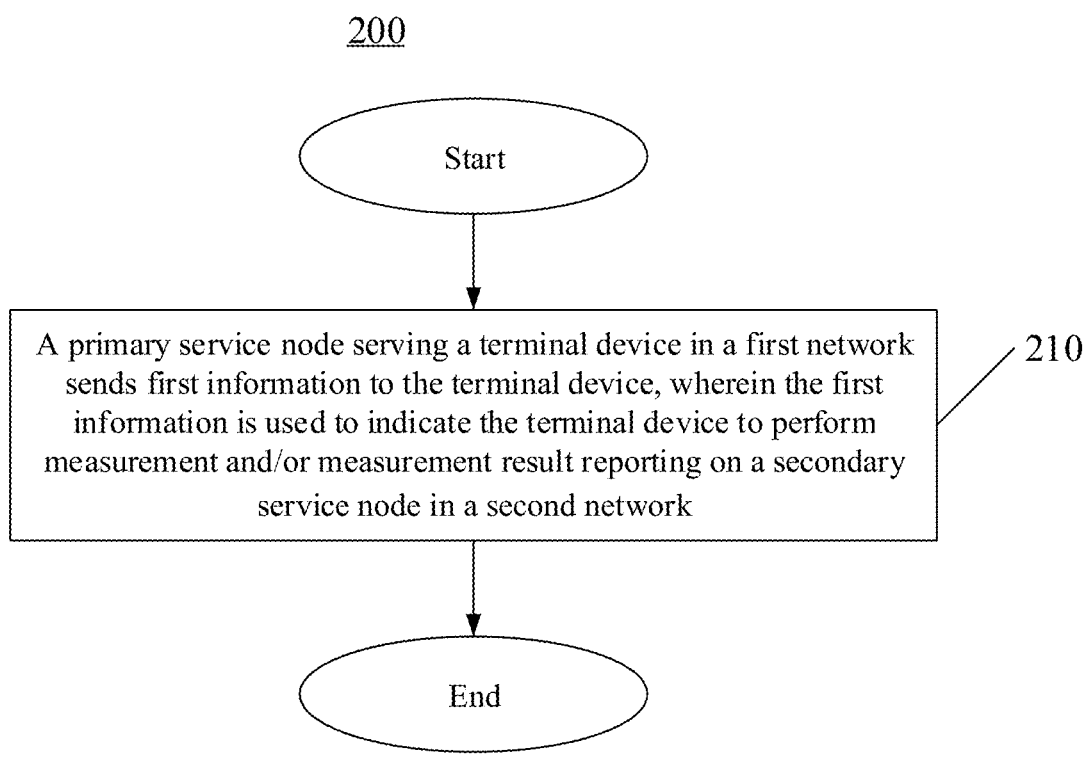
FIG. 2 is a schematic flowchart of a wireless communication method according to an embodiment of the present application.

FIG. 2 is a schematic flowchart of a wireless communication method 200 according to an embodiment of the present application. The method 200 is optionally applicable to the system shown in FIG. 1, but is not limited thereto. As shown in FIG. 2, the method 200 includes at least some of the following.

In 210, a primary service node serving a terminal device in a first network sends first information to the terminal device, wherein the first information is used to indicate the terminal device to perform measurement and/or measurement result reporting on a secondary service node in a second network.

In at least one embodiment, network types of the first network and the second network can be different. For example, the first network can be an NR network, and the second network can be an LTE network; or the first network can be an LTE network, or the second network can be an NR network.

In at least one embodiment, the secondary service node corresponding to the single measurement and/or the single measurement result reporting indicated by the first information includes at least two secondary service nodes.

In at least one embodiment, in an embodiment of the present application, the single measurement result reporting is triggered by a single event, and the object that needs to be measured for the event can include a plurality of secondary service nodes. A single measurement is a measurement required for a single measurement result report, and can include measurements on a plurality of secondary service nodes.

In at least one embodiment, the at least two secondary service nodes can be in the same network; or can be in different networks. In this case, the first network can include two types of networks.

In at least one embodiment, in an embodiment of the present application, the network device can implicitly or explicitly indicate a secondary service node on which the measurement and/or the measurement result reporting is performed.

In at least one embodiment, in an embodiment of the present application, the first information carries at least one of a frequency identifier (Identifier, ID), a node identifier ID, a cell ID, or a network type of the secondary service node.

In an implementation, the primary service node indicates the frequency ID of the secondary service node, and the terminal device can directly perform the measurement and/ or the measurement result reporting with respect to the corresponding frequency according to the frequency ID, and can implement the measurement and/or the measurement result reporting with respect to the corresponding secondary service node.

In an implementation, the primary service node indicates a cell ID of the secondary service node, and the terminal device can perform measurement and/or measurement result reporting with respect to the corresponding cell according to the cell ID, and can implement the measurement and/or the measurement result reporting with respect to the corresponding secondary service node to which the cell ID belongs.

In an implementation, the primary service node indicates a network type to be measured, and the terminal device can perform measurement and/or measurement result reporting with respect to a currently serving secondary service cell of the network type and/or a detectable secondary service cell of the network type.

In an implementation, the primary service node indicates a node ID of the secondary service node to be measured, and the terminal device can perform measurement and/or measurement result reporting with respect to the secondary service node corresponding to the node ID.

Of course, in an embodiment of the present application, the first message can further carry at least two of a frequency ID, a node ID, a cell ID, and a network type of the secondary service node.

In at least one embodiment, in an embodiment of the present application, the first information can be used to indicate an event that triggers the terminal device to report the measurement result. If the event is met, the terminal device can report the measurement result.

In at least one embodiment, the at least two secondary service nodes can be secondary service nodes that are currently serving the terminal device, and by configuring the terminal device to perform measurement or measurement result reporting on the secondary service nodes that are currently serving the terminal device, the primary service node can determine which secondary service node to be deleted from the at least two secondary service nodes based on the measurement results of the at least two secondary service nodes.

In at least one embodiment, the at least two secondary service nodes can be secondary service nodes that are not currently serving the terminal device, and by configuring the terminal device to perform measurement or measurement result reporting on the secondary service nodes that are not currently serving the terminal device, the primary service node can determine which secondary service node to be configured for the terminal device from the at least two secondary service nodes based on the measurement results of the at least two secondary service nodes.

In at least one embodiment, in an embodiment of the present application, the at least two service nodes can include at least one secondary service node that is currently serving the terminal device and a secondary service node that is not currently serving the terminal device. The terminal device can measure the at least one secondary service node that is currently serving the terminal device and the secondary service node that is not currently serving the terminal device, and report the measurement results to the network device, and the network device can determine whether to switch the secondary service node for the terminal device.

In at least one embodiment, the first information is used to indicate to the terminal device a first event for triggering the measurement result reporting; and the first event is used to indicate to perform measurement result reporting when a comparison result between the measurement results of the at least two secondary service nodes satisfies a triggering condition, and/or, to perform measurement result reporting when comparison results respectively between the measurement results of the at least two secondary service nodes and predetermined values satisfy a triggering condition. The predetermined values respectively for comparing can be the same or can also be different.

In order to understand the present application more clearly, the following will described in connection with an example in which the at least two secondary service nodes includes at least one secondary service node (a first secondary service node) that is currently serving the terminal device and at least one secondary service node (second secondary service node) that is not currently serving the terminal device.

In an implementation, the first event is: a channel quality of a first cell of the second secondary service node being better than a channel quality of a second cell of the first secondary service node by at least a first predetermined value.

In at least one embodiment, the first cell includes at least one cell in which the second secondary service node being able to provide service for the terminal device, and the second cell includes all secondary service cells or the secondary service cell with the best channel quality in which the first secondary service node providing service for the terminal device.

In at least one embodiment, the first cell includes at least one cell in which the second secondary service node being able to provide service for the terminal device, and the second cell includes all cells, a cell having a channel quality, all service cell, the secondary service cell with the best channel quality, a primary service cell or a secondary service cell in which the first secondary service node providing service for the terminal device.

In an implementation, the first event is: a channel quality of a third cell of the first secondary service node being worse than or equal to a second predetermined value, and a channel quality of a fourth cell of the second secondary service node being better than or equal to a third predetermined value.

In at least one embodiment, the third cell is all cells, a cell with the best channel quality, all service cells, a service cell with the best channel quality, or a primary service cell or a secondary service cell of the first secondary service node; and the fourth cell is at least one cell in which the second secondary service node being able to provide service for the terminal device.

In at least one embodiment, in an embodiment of the present application, the triggering of the event can be that a channel quality of a secondary service node satisfies a predetermined condition, and secondary service node configuration is performed on the terminal device according to the measurement result of the terminal device.

In an implementation, the first information indicates that the secondary service node that needs to be measured includes a third secondary service node, wherein the third secondary service node is a node that is currently serving the terminal device;

the first information is further used to indicate to the terminal device a second event for triggering the measurement result reporting; and the second event is used to indicate that a channel quality of a service cell of the third secondary service node is better than or equal to a fourth predetermined value.

In an implementation, the first information indicates that the secondary service node on which the measurement and/or the measurement result reporting is to be performed includes a fourth secondary service node, wherein the fourth secondary service node is a node that is currently serving the terminal device; the first information is further used to indicate to the terminal device a third event for triggering the measurement result reporting; and the third event is used to indicate that a channel quality of a fifth cell of the fourth secondary service node is worse than or equal to a fifth predetermined value.

In at least one embodiment, the fifth cell is all cells, a cell with the best channel quality, all service cells or a service cell with the best channel quality of the fourth secondary service node.

In at least one embodiment, in an embodiment of the present application, in different scenarios, a number of the secondary service nodes corresponding to the single measurement and/or measurement result reporting configured by the primary service node can be different, and/or the networks to which belong the secondary service nodes corresponding to the single measurement and/or measurement result reporting configured by the primary service node can be different.

For example, in a scenario, a secondary service node corresponding to the single measurement and/or the single measurement result reporting configured by the primary service node is a secondary service node in the same network as the primary service node.

At this time, the corresponding trigger event can be the following events, wherein a neighboring cell can be a cell of the secondary service node.

Event A1 (serving becomes better than threshold), which means that the signal quality of the service cell of the primary service node is higher than a certain threshold. When an event that satisfies this condition is reported, the primary service node stops different-frequency/different-system measurement.

Event A2 (serving becomes worse than threshold), which means that the signal quality of the service cell of the primary service node is below a certain threshold. When an event that satisfies this condition is reported, the primary service node initiates different-frequency/different-system measurement.

Event A3 (neighbor becomes offset better than PCell/PSCell), which means that a quality of a neighboring cell is higher than that of the service cell of the primary service node by a certain threshold and for a certain period of time. When an event that satisfies this condition is reported, the primary service node can initiate a handover request.

Event A4 (neighbor becomes better than threshold), which means that a quality of a neighboring area is higher than a certain threshold. When an event that satisfies this condition is reported, the primary service node can initiate a handover request.

Event A5 (PCell/PSCell becomes worse than threshold 1 and neighbor becomes better than threshold 2), which means that the quality of the service cell is below a certain threshold and a quality of a neighboring cell is above a certain threshold.

Event A6 (Neighbor becomes offset better than SCell), which means that a quality of a neighboring cell is higher than that of the service cell of the primary service node by a certain threshold.

In another scenario, a secondary service node corresponding to the single measurement and/or the single measurement result reporting configured by the primary service node is a secondary service node in a different network from that of the primary service node.

In this case, the corresponding triggering event can be as follows.

Event B1 (Inter RAT neighbor becomes better than threshold), which means that a quality of a neighboring cell of a different system is higher than a certain threshold. an event that satisfies this condition is reported, the primary service node can initiate a different-system handover request.

Event B2 (PCell becomes worse than threshold 1 and inter RAT neighbor becomes better than threshold 2), which means that the quality of the service cell is below a certain threshold and a quality of a neighboring cell of a different system is above a certain threshold.

In another scenario, a secondary service node corresponding to the single measurement and/or the single measurement result reporting configured by the primary service node is at least two secondary service nodes in different networks from that of the primary service node.

In this case, the corresponding triggering event can be an event in any implementation of the above first events.

For this or other similar situations, how to implement the transmission of a message (a first message, the first message including the first information) will be described below.

In an implementation, the first information includes a second field, wherein the second field identifies a network to which the secondary service node corresponding to the measurement belongs and/or measurement result reporting, and/or a number of the secondary service nodes to be measured.

Specifically, the second field identifies a type of the network to which the secondary service node corresponding to the measurement and/or measurement result reporting belongs, or identifies the similarity and difference between the network to which the secondary service node corresponding to the measurement and/or measurement result reporting and that of the primary service node belongs.

In an implementation, the first message includes at least two second fields, and different second fields of the at least two second fields indicate different networks to which belong the secondary service nodes corresponding to the measurement and/or measurement result reporting and/or different numbers of secondary service nodes that need to be measured.

For example, there are three second fields, one field is for configuring measurement and/or measurement result reporting with respect to a secondary service node of the same network, one field is for configuring measurement and/or measurement result reporting with respect to a secondary service node of a different network, and one field is for configuring measurement and/or measurement result reporting with respect to at least two secondary service nodes of different networks.

In an implementation, the first information includes a first field, wherein the first field identifies a network to which a secondary service node corresponding to the first information belongs and/or a number of the secondary service nodes corresponding to the first information.

In at least one embodiment, the network to which a secondary service node corresponding to the first information belongs and/or the number of the secondary service nodes corresponding to the first information is identified by a first field, which means that when the values in the first field are different, the network (for example, the network type) to which a secondary service node corresponding to the first information belongs is different and/or the number of the secondary service nodes corresponding to the first information is different.

Specifically, the first message includes a field A and a field B. When the value of the field A has a different value, the network to which a secondary service node indicated by the field B on which the measurement and/or the measurement result reporting is to be performed belongs and/or the number of the secondary service nodes need to be measured is different.

Wherein, the field A can include at least one bit; and the field B can include at least one bit.

For example, the field A includes 1 bit. When the value of the field A is 1, it indicates that the measurement and/or measurement result reporting configured in the field B is with respect one secondary service node of a different network. When the value of the field A is 0, it indicates that the measurement and/or measurement result reporting configured in the field B is with respect one secondary service node of the same network.

For example, the field A includes 1 bit. When the value of the field A is 1, it indicates that the measurement and/or measurement result reporting configured in the field B is with respect one secondary service node of a different network. When the value of the field A is 0, it indicates that the measurement and/or measurement result reporting configured in the field B is with respect two secondary service nodes of different networks.

For example, the field A includes 1 bit. When the value of the field A is 1, it indicates that the measurement and/or measurement result reporting configured in the field B is with respect one secondary service node of the same network. When the value of the field A is 0, it indicates that the measurement and/or measurement result reporting configured in the field B is with respect one secondary service nodes of a different network.

In at least one embodiment, in the embodiment of the present application, the primary service node can perform deletion, addition, and modification of the secondary service node according to the measurement result reported by the terminal device, and can also perform handover of the primary service node according to the measurement result, that is, switching a secondary service node to a primary service node.

Figure 3:
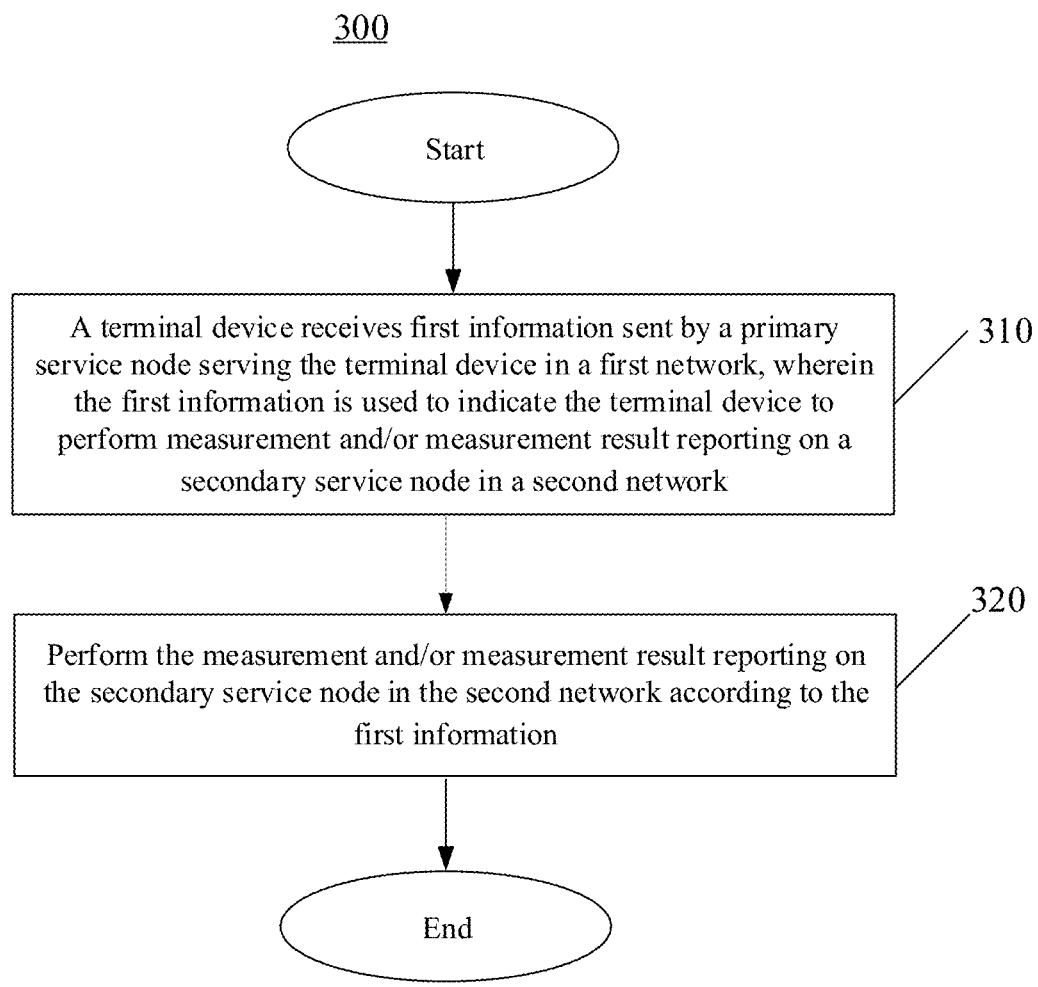
FIG. 3 is a schematic flowchart of a wireless communication method according to an embodiment of the present application.

FIG. 3 is a schematic flowchart of a wireless communication method 300 according to an embodiment of the present application. As shown in FIG. 3, the method 300 includes at least some of the following.

In 310, a terminal device receives first information sent by a primary service node serving the terminal device in a first network, wherein the first information is used to indicate the terminal device to perform measurement and/or measurement result reporting on a secondary service node in a second network.

In 320, the measurement and/or measurement result reporting is performed on the secondary service node in the second network according to the first information.

In at least one embodiment, the secondary service node indicated by the first information on which the measurement and/or the measurement result reporting is to be performed includes at least two secondary service nodes.

In at least one embodiment, the at least two secondary service nodes include a first secondary service node and a second secondary service node;

wherein, the first secondary service node is a node that is currently serving the terminal device, and the second secondary service node is a node that is not currently serving the terminal device.

In at least one embodiment, the first information is further used to indicate to the terminal device a first event for triggering the measurement result reporting; and the first event is used to indicate to perform measurement result reporting when a comparison result between the measurement results of the at least two secondary service nodes satisfies a triggering condition, and/or, to perform measurement result reporting when comparison results respectively between the measurement results of the at least two secondary service nodes and predetermined values satisfy a triggering condition.

In at least one embodiment, the first event is:

a channel quality of a first cell of the second secondary service node being better than a channel quality of a second cell of the first secondary service node by at least a first predetermined value.

In at least one embodiment, the first cell includes at least one cell in which the second secondary service node being able to provide service for the terminal device; and the second cell includes all secondary service cells or the secondary service cell with the best channel quality in which the first secondary service node providing service for the terminal device.

In at least one embodiment, the first cell includes at least one cell in which the second secondary service node being able to provide service for the terminal device; and the second cell includes all cells, a cell having a channel quality, all service cell, the secondary service cell with the best channel quality, a primary service cell or a secondary service cell in which the first secondary service node providing service for the terminal device.

In at least one embodiment, the first event is:

a channel quality of a third cell of the first secondary service node being worse than or equal to a second predetermined value, and a channel quality of a fourth cell of the second secondary service node being better than or equal to a third predetermined value.

In at least one embodiment, the third cell is all cells, a cell with the best channel quality, all service cells, a service cell with the best channel quality, or a primary service cell or a secondary service cell of the first secondary service node; and the fourth cell is at least one cell in which the second secondary service node being able to provide service for the terminal device.

In at least one embodiment, the first information indicates that the secondary service node that needs to be measured includes a third secondary service node, wherein the third secondary service node is a node that is currently serving the terminal device;

the first information is further used to indicate to the terminal device a second event for triggering the measurement result reporting; and the second event is used to indicate that a channel quality of a service cell of the third secondary service node is better than or equal to a fourth predetermined value.

In at least one embodiment, the first information indicates that the secondary service node on which the measurement and/or the measurement result reporting needs to be performed includes a fourth service node, wherein the fourth service node is a node currently serving the terminal device.

The first information is further used to indicate to the terminal device a third event for triggering the measurement result reporting; and the third event is used to indicate that a channel quality of a fifth cell of the third service node is worse than or equal to a fifth predetermined value.

In at least one embodiment, the fifth cell is all cells, a cell with the best channel quality, all service cells or a service cell with the best channel quality of the fourth secondary service node.

In at least one embodiment, the first information is carried in a first message, wherein the first message includes a field A and a field B. When the value of the field A has a different value, the network to which a secondary service node indicated by the field B on which the measurement belongs and/or the measurement result reporting is to be performed and/or the number of the secondary service nodes need to be measured is different.

In at least one embodiment, the first information includes a first field, wherein the first field identifies a network to which the secondary service node corresponding to the first information belongs and/or a number of the secondary service nodes corresponding to the first information.

In at least one embodiment, the first information includes a second field, wherein the second field identifies a network to which the secondary service node corresponding to the measurement and/or the measurement result reporting belongs and/or a number of secondary service nodes that need to be measured.

In at least one embodiment, the first information is carried in a first message, wherein the first message includes at least two third fields, and different third fields in the at least two third fields indicate different networks to which belong the secondary service nodes on which the measurement and/or the measurement result reporting is to be performed and/or numbers of secondary service nodes to be measured are different.

In at least one embodiment, the first information carries at least one of a frequency identifier, a node identifier ID, a cell ID, or a network type of the secondary service node.

In at least one embodiment, a network type of the first network is different from a network type of the second network.

It should be understood that, in an embodiment of the present application, the description of the method 300 shown in FIG. 3 can refer to the method 200 shown in FIG. 2, and details are not repeated herein for brevity.

Figure 4:
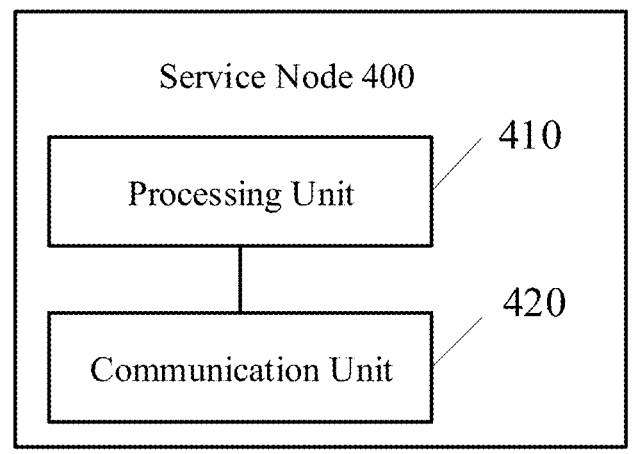
FIG. 4 is a schematic block diagram of a service node according to an embodiment of the present application.

FIG. 4 is a schematic block diagram of a service node 400 according to an embodiment of the present application. The service node is a primary service node serving a terminal device in a first network. As shown in FIG. 4, the service node 400 includes a processing unit 410 and a communication unit 420.

The processing unit is configured to determine first information, wherein the first information is used to indicate the terminal device to perform measurement and/or measurement result reporting on a secondary service node in a second network; and the communication unit 420 is configured to send the first information to the terminal device.

In at least one embodiment, the secondary service node corresponding to the single measurement and/or the single measurement result reporting indicated by the first information includes at least two secondary service nodes.

In at least one embodiment, the at least two secondary service nodes include a first secondary service node and a second secondary service node;

wherein the first secondary service node is a node that is currently serving the terminal device, and the second secondary service node is a node that is not currently serving the terminal device.

In at least one embodiment, the first information is further used to indicate to the terminal device a first event for triggering the measurement result reporting; and the first event is used to indicate to perform measurement result reporting when a comparison result between the measurement results of the at least two secondary service nodes satisfies a triggering condition, and/or, to perform measurement result reporting when comparison results respectively between the measurement results of the at least two secondary service nodes and predetermined values satisfy a triggering condition.

In at least one embodiment, the first event is:

a channel quality of a first cell of the second secondary service node being better than a channel quality of a second cell of the first secondary service node by at least a first predetermined value.

In at least one embodiment, the first cell includes at least one cell in which the second secondary service node being able to provide service for the terminal device; and the second cell includes all secondary service cells or the secondary service cell with the best channel quality in which the first secondary service node providing service for the terminal device.

In at least one embodiment, the first cell includes at least one cell in which the second secondary service node being able to provide service for the terminal device; and the second cell includes all cells, a cell having a channel quality, all service cell, the secondary service cell with the best channel quality, a primary service cell or a secondary service cell in which the first secondary service node providing service for the terminal device.

In at least one embodiment, the first event is:

a channel quality of a third cell of the first secondary service node being worse than or equal to a second predetermined value, and a channel quality of a fourth cell of the second secondary service node being better than or equal to a third predetermined value.

In at least one embodiment, the third cell is all cells, a cell with the best channel quality, all service cells, a service cell with the best channel quality, or a primary service cell or a secondary service cell of the first secondary service node; and the fourth cell is at least one cell in which the second secondary service node being able to provide service for the terminal device.

In at least one embodiment, the first information indicates that the secondary service node that needs to be measured includes a third secondary service node, wherein the third secondary service node is a node that is currently serving the terminal device;

the first information is further used to indicate to the terminal device a second event for triggering the measurement result reporting; and the second event is used to indicate that a channel quality of a service cell of the third secondary service node is better than or equal to a fourth predetermined value.

In at least one embodiment, the first information indicates that the secondary service node on which the measurement and/or the measurement result reporting needs to be performed includes a fourth service node, wherein the fourth service node is a node currently serving the terminal device.

The first information is further used to indicate to the terminal device a third event for triggering the measurement result reporting; and the third event is used to indicate that a channel quality of a fifth cell of the third service node is worse than or equal to a fifth predetermined value.

In at least one embodiment, the fifth cell is all cells, a cell with the best channel quality, all service cells or a service cell with the best channel quality of the fourth secondary service node.

In at least one embodiment, the first information includes a first field, wherein the first field identifies a network to which the secondary service node corresponding to the first information belongs and/or a number of the secondary service nodes corresponding to the first information.

In at least one embodiment, the first information is carried in a first message, wherein the first information includes a second field, and the second field identifies a network to which the secondary service node corresponding to the measurement and/or the measurement result reporting belongs and/or a number of secondary service nodes that need to be measured.

In at least one embodiment, the first information carries at least one of a frequency identifier, a node identifier ID, a cell ID, or a network type of the secondary service node.

In at least one embodiment, a network type of the first network is different from a network type of the second network.

In at least one embodiment, the communication unit 420 is further configured to receive a measurement report sent by the terminal device; and the processing unit 410 is further configured to perform secondary service node configuration for the terminal device according to the measurement report, and the configuration includes adding, modifying, and deleting the secondary service node.

It should be understood that the service node 400 can correspond to the primary service node in the method embodiment, and can the implement corresponding operations implemented by the primary service node in the method embodiment, details of which will not be repeated herein for brevity.

Figure 5:
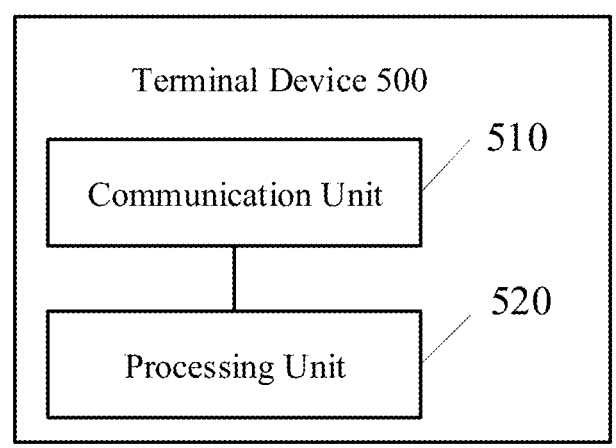
FIG. 5 is a schematic block diagram of a terminal device according to an embodiment of the present application.

FIG. 5 is a schematic block diagram of a terminal device 500 according to an embodiment of the present application. As shown in FIG. 5, the terminal device 500 includes a communication unit 510 and a processing unit 520.

The communication unit 510 is configured to receive first information sent by a primary service node serving the terminal device in a first network, wherein the first information is used to indicate the terminal device to perform measurement and/or measurement result reporting on a secondary service node in a second network.

The processing unit 520 is configured to perform measurement and/or measurement result reporting on the secondary service node in the second network according to the first information.

According to one embodiment, the processing unit 520 may be a processor configured to perform corresponding operation, and the communication unit 510 may be a transceiver configured to transmit/receive data.

In at least one embodiment, the secondary service node corresponding to the single measurement and/or the single measurement result reporting indicated by the first information includes at least two secondary service nodes.

In at least one embodiment, the at least two secondary service nodes include a first secondary service node and a second secondary service node;

wherein the first secondary service node is a node that is currently serving the terminal device, and the second secondary service node is a node that is not currently serving the terminal device.

In at least one embodiment, the first information is further used to indicate to the terminal device a first event for triggering the measurement result reporting; and the first event is used to indicate to perform measurement result reporting when a comparison result between the measurement results of the at least two secondary service nodes satisfies a triggering condition, and/or, to perform measurement result reporting when comparison results respectively between the measurement results of the at least two secondary service nodes and predetermined values satisfy a triggering condition.

In at least one embodiment, the first event is:

a channel quality of a first cell of the second secondary service node being better than a channel quality of a second cell of the first secondary service node by at least a first predetermined value.

In at least one embodiment, the first cell includes at least one cell in which the second secondary service node being able to provide service for the terminal device; and the second cell includes all secondary service cells or the secondary service cell with the best channel quality in which the first secondary service node providing service for the terminal device.

In at least one embodiment, the first cell includes at least one cell in which the second secondary service node being able to provide service for the terminal device; and the second cell includes all cells, a cell having a channel quality, all service cell, the secondary service cell with the best channel quality, a primary service cell or a secondary service cell in which the first secondary service node providing service for the terminal device.

In at least one embodiment, the first event is:

a channel quality of a third cell of the first secondary service node being worse than or equal to a second predetermined value, and a channel quality of a fourth cell of the second secondary service node being better than or equal to a third predetermined value.

In at least one embodiment, the third cell is all cells, a cell with the best channel quality, all service cells, a service cell with the best channel quality, or a primary service cell or a secondary service cell of the first secondary service node; and the fourth cell is at least one cell in which the second secondary service node being able to provide service for the terminal device.

In at least one embodiment, the first information indicates that the secondary service node that needs to be measured includes a third secondary service node, wherein the third secondary service node is a node that is currently serving the terminal device;

the first information is further used to indicate to the terminal device a second event for triggering the measurement result reporting; and the second event is used to indicate that a channel quality of a service cell of the third secondary service node is better than or equal to a fourth predetermined value.

In at least one embodiment, the first information indicates that the secondary service node on which the measurement and/or the measurement result reporting needs to be performed includes a fourth service node, wherein the fourth service node is a node currently serving the terminal device.

The first information is further used to indicate to the terminal device a third event for triggering the measurement result reporting; and the third event is used to indicate that a channel quality of a fifth cell of the third service node is worse than or equal to a fifth predetermined value.

In at least one embodiment, the fifth cell is all cells, a cell with the best channel quality, all service cells or a service cell with the best channel quality of the fourth secondary service node.

In at least one embodiment, the first information is carried in the first message, where the first message includes a first field and a second field, and when the first field takes a different value, a network to which the secondary service node and/or a number of secondary service nodes corresponding to the single measurement belongs and/or the single measurement result reporting indicated by the second field is different.

In at least one embodiment, the first information includes a second field, and the second field identifies a network to which the secondary service node corresponding to the measurement and/or the measurement result reporting belongs and/or a number of secondary service nodes that need to be measured.

In at least one embodiment, a network type of the first network is different from a network type of the second network.

It should be understood that the terminal device 500 can correspond to the terminal device in the method embodiment, and can implement the corresponding operations implemented by the terminal device in the method embodiment, details of which will not be repeated herein for brevity.

Figure 6:
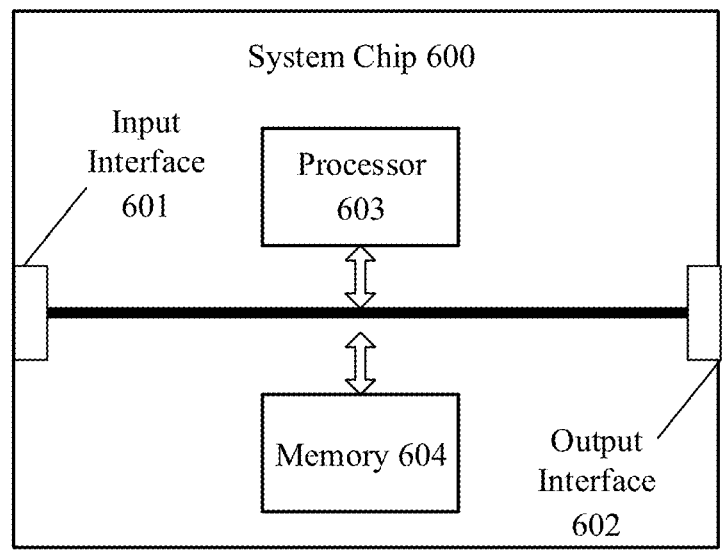
FIG. 6 is a schematic block diagram of a system chip according to an embodiment of the present application.

FIG. 6 is a schematic structural diagram of a system chip 600 according to an embodiment of the present application. The system chip 600 of FIG. 6 includes an input interface 601, an output interface 602, a processor 603, and a memory 604 that can be connected by an internal communication connection line. The processor 603 is configured to execute codes in the memory 604.

In at least one embodiment, when the codes are executed, the processor 603 implements a method performed by the primary service node in the method embodiment. For the sake of brevity, it will not be repeated herein.

In at least one embodiment, when the codes are executed, the processor 603 implements a method performed by the terminal device in the method embodiment. For the sake of brevity, it will not be repeated herein.

Figure 7:
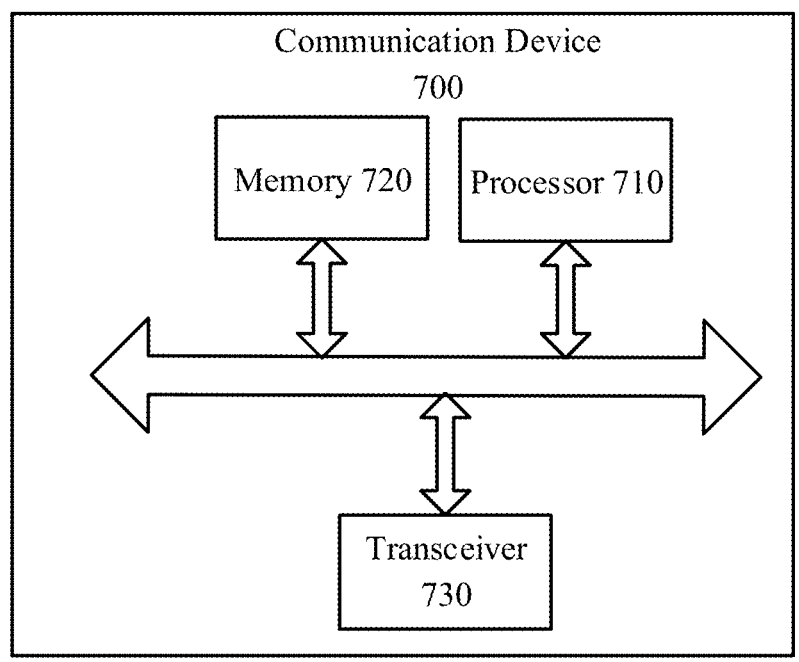
FIG. 7 is a schematic block diagram of a communication device according to an embodiment of the present application.

FIG. 7 is a schematic block diagram of a communication device 700 according to an embodiment of the present application. As shown in FIG. 7, the communication device 700 includes a processor 710 and a memory 720. The memory 720 can store program codes, and the processor 710 can execute the program codes stored in the memory 720.

In at least one embodiment, as shown in FIG. 7, the communication device 700 can include a transceiver 730, and the processor 710 can control the transceiver 730 to communicate with external entities.

In at least one embodiment, the processor 710 can call the program codes stored in the memory 720 to perform the corresponding operations of the primary service node in the method embodiment. For the sake of brevity, it will not be repeated herein.

In at least one embodiment, the processor 710 can call the program codes stored in the memory 720 to perform the corresponding operations of the terminal device in the method embodiment. For the sake of brevity, it will not be repeated herein.

Therefore, in the embodiments of the present application, the terminal device performs measurement and/or measurement result reporting on the secondary service node in the network according to the indication of the primary service node, so that the primary service node can configure a proper secondary service node for the terminal device.

It should be understood that the processor of the embodiment of the present application can be an integrated circuit chip with signal processing capability. In the implementation process, each step of the above method embodiment can be completed by an integrated logic circuit of hardware in a processor or an instruction in a form of software. The processor can be a general-purpose processor, a digital signal processor (DSP), an application specific integrated circuit (ASIC), a Field Programmable Gate Array (FPGA), a programmable logic device, discrete gates or transistor logic devices, discrete hardware components. The methods, steps, and logical block diagrams disclosed in embodiments of the present application can be implemented or executed. The general purpose processor can be a microprocessor or the processor or any conventional processor or the like. The steps of the method disclosed in embodiments of the present application can be directly implemented by the hardware decoding processor, or can be performed by a combination of hardware and software modules in the decoding processor. The software module can be located in a conventional storage medium such as a random access memory, a flash memory, a read only memory, a programmable read only memory or an electrically erasable programmable memory, a register, and the like. The storage medium is located in the memory, and the processor reads the information in the memory and combines the hardware to complete the steps of the above method.

It is to be understood that the memory in embodiments of the present application can be a volatile memory or a non-volatile memory, or can include both volatile and non-volatile memory. The non-volatile memory can be a read-only memory (ROM), a programmable read only memory (PROM), an erasable programmable read only memory (Erasable PROM, EPROM), or an electric Erase programmable read only memory (EEPROM) or a flash memory. The volatile memory can be a Random Access Memory (RAM) that acts as an external cache. By way of example and not limitation, many forms of RAMs are available, such as a static random access memory (SRAM), a dynamic random access memory (DRAM), a synchronous dynamic random access memory (Synchronous DRAM, SDRAM), a Double Data Rate SDRAM (DDR SDRAM), an Enhanced Synchronous Dynamic Random Access Memory (Enhanced SDRAM, ESDRAM), a Synchronous Connection Dynamic Random Access Memory (Synchlink DRAM, SLDRAM) and a direct memory bus random access memory (Direct Rambus RAM, DR RAM). It should be noted that the memories of the systems and methods described herein are intended to include, without being limited to, these and any other suitable types of memories.

Those of ordinary skill in the art will appreciate that the units and algorithm steps of the various examples described in connection with the embodiments disclosed herein can be implemented in electronic hardware or a combination of computer software and electronic hardware. Whether these functions are performed in hardware or software depends on the specific application and design constraints of the technical solution. A person skilled in the art can use different methods to implement the described functions for each particular application, but such implementation should not be considered to be beyond the scope of the present application.

A person skilled in the art can clearly understand that for the convenience and brevity of the description, the specific working process of the system, the device and the unit described above can refer to the corresponding process in the above method embodiment, and details are not described herein again.

In the several embodiments provided by the present application, it should be understood that the disclosed systems, devices, and methods can be implemented in other manners. For example, the device embodiments described above are merely illustrative. For example, the division of the unit is only a logical function division. In actual implementation, there can be another division manner, for example, multiple units or components can be combined or can be integrated into another system, or some features can be ignored or not executed. In addition, the mutual coupling or direct coupling or communication connection shown or discussed can be an indirect coupling or communication connection through some interfaces, devices or units, and can be in an electrical, mechanical or other form.

The units described as separate components can or cannot be physically separated, and the components displayed as units can or cannot be physical units, that is, can be located in one place, or can be distributed to a plurality of network units. Some or all of the units can be selected according to actual needs to achieve the purpose of the solution of the embodiment.

In addition, each functional unit in each embodiment of the present application can be integrated into one processing unit, or each unit can exist physically separately, or two or more units can be integrated into one unit.

The functions can be stored in a computer readable storage medium if implemented in the form of a software functional unit and sold or used as a standalone product. Based on such understanding, the technical solution of the present application, in its essential or with a part contributing to the prior art or a part of the technical solution, can be embodied in the form of a software product, which is stored in a storage medium, including instructions to cause a computer device (which can be a personal computer, a server, or a network device, etc.) to perform all or part of the steps of the methods described in various embodiments of the present application. The above storage medium includes: a U disk, a mobile hard disk, a read-only memory (ROM), a random access memory (RAM), a magnetic disk, or an optical disk, and the like, which can store program codes.

The above is only a specific embodiment of the present application, but the scope of protection of the present application is not limited thereto, and changes or substitutions that could be easily contemplated by any person skilled in the art within the technical scope disclosed in the present application should be covered by the scope of protection of this application. Therefore, the scope of protection of the present application should be determined by the scope of the claims.

What is claimed is:

1. A wireless communication method, comprising:
    sending, by a primary service node serving a terminal device in a first network, first information to the terminal device, wherein the first information is used to indicate the terminal device to perform at least one of measurement or measurement result reporting on a secondary service node in a second network, wherein the secondary service node in the second network is a network service node same as or different from that of the primary service node,
    wherein the first information indicates that the secondary service node on which the at least one of the measurement or the measurement result reporting needs to be performed comprises a fourth secondary service node, wherein the fourth secondary service node is a node that is serving the terminal device;
    the first information is further used to indicate to the terminal device a third event for triggering the measurement result reporting; and
    the third event is used to indicate that a channel quality of a fifth cell of the fourth secondary service node is worse than or equal to a fifth predetermined value,
    wherein the fifth cell comprises all cells, a cell with a best channel quality, all service cells or a service cell with the best channel quality of the fourth secondary service node,
    wherein the first information performs one of the following:
        comprises a first field, wherein the first field identifies at least one of a network to which the secondary service node corresponding to the first information belongs or a number of the secondary service nodes corresponding to the first information;
        comprises a second field, and the second field identifies at least one of a network to which the secondary service node corresponding to the at least one of the measurement or the measurement result reporting belongs or a number of secondary service nodes that need to be measured; and
        carries at least one of a frequency identifier, a node identifier ID, a cell ID, or a network type of the secondary service node.

2. The method according to claim 1, wherein the secondary service node corresponding to at least one of a single measurement or a single measurement result reporting indicated by the first information comprises at least a first secondary service node or a second secondary service node,
    the first secondary service node is a node that is serving the terminal device, and the second secondary service node is a node that is not serving the terminal device.

3. The method according to claim 2, wherein the first information is further used to indicate to the terminal device a first event for triggering the measurement result reporting; and
    the first event is used to indicate to perform measurement result reporting in at least one case of:
        a comparison result between measurement results of the at least two secondary service nodes satisfies a triggering condition, and
        comparison results respectively between the measurement results of the at least two secondary service nodes and predetermined values satisfy a triggering condition.

4. The method according to claim 3, wherein the first event is:
    a channel quality of a first cell of the second secondary service node being better than a channel quality of a second cell of the first secondary service node by at least a first predetermined value,
    wherein first cell comprises at least one cell in the second secondary service node being able to provide service for the terminal device; and
    the second cell comprises all secondary service cells, the secondary service cell with the best channel quality, all cells, a cell having a channel quality, all service cell, the secondary service cell with the best channel quality, a primary service cell or a secondary service cell in the first secondary service node providing service for the terminal device.

5. The method according to claim 3, wherein the first event is:
a channel quality of a third cell of the first secondary service node being worse than or equal to a second predetermined value, and a channel quality of a fourth cell of the second secondary service node being better than or equal to a third predetermined value,
wherein the third cell comprises all cells, a cell with the best channel quality, all service cells, a service cell with the best channel quality, a primary service cell or a secondary service cell of the first secondary service node; and
the fourth cell comprises at least one cell in the second secondary service node being able to provide service for the terminal device.

6. The method according to claim 1, wherein the first information indicates that the secondary service node that needs to be measured comprises a third secondary service node, wherein the third secondary service node is a node that is serving the terminal device;
the first information is further used to indicate to the terminal device a second event for triggering the measurement result reporting; and
the second event is used to indicate that a channel quality of a secondary service cell of the third secondary service node is better than or equal to a fourth predetermined value.

7. A wireless communication method, comprising:
receiving, by a terminal device, first information sent by a primary service node serving the terminal device in a first network, wherein the first information is used to indicate the terminal device to perform at least one of measurement or measurement result reporting on a secondary service node in a second network; and
performing the at least one of the measurement or the measurement result reporting on the secondary service node in the second network according to the first information,
wherein the secondary service node in the second network is a network service node same as or different from that of the primary service node, and
wherein the secondary service node corresponding to at least one of a single measurement or a single measurement result reporting indicated by the first information comprises at least a first secondary service node and a second secondary service node, and the first secondary service node is a node that is serving the terminal device, and the second secondary service node is a node that is not serving the terminal device,
wherein the first information indicates that the secondary service node on which the at least one of the measurement or the measurement result reporting needs to be performed comprises a fourth secondary service node, wherein the fourth secondary service node is a node that is serving the terminal device;
the first information is further used to indicate to the terminal device a third event for triggering the measurement result reporting; and
the third event is used to indicate that a channel quality of a fifth cell of the fourth secondary service node is worse than or equal to a fifth predetermined value,
wherein the fifth cell comprises all cells, a cell with a best channel quality, all service cells or a service cell with the best channel quality of the fourth secondary service node,
wherein the first information performs one of the following:
comprises a first field, and the first field identifies at least one of a network to which the secondary service node corresponding to the first information belongs or a number of the secondary service nodes corresponding to the first information;
comprises a second field, and the second field identifies at least one of a network to which the secondary service node corresponding to the at least one of the measurement or the measurement result reporting belongs or a number of secondary service nodes that need to be measured; and
carries at least one of a frequency identifier, a node identifier ID, a cell ID, or a network type of the secondary service node.

8. The method according to claim 7, wherein the first information is further used to indicate to the terminal device a first event for triggering the measurement result reporting; and
the first event is used to indicate to perform measurement result reporting in at least one case of:
a comparison result between the measurement results of the at least two secondary service nodes satisfies a triggering condition, and,
comparison results respectively between the measurement results of the at least two secondary service nodes and predetermined values satisfy a triggering condition.

9. The method according to claim 8, wherein the first event is:
a channel quality of a first cell of the second secondary service node being better than a channel quality of a second cell of the first secondary service node by at least a first predetermined value,
wherein the first cell comprises at least one cell in the second secondary service node being able to provide service for the terminal device; and
the second cell comprises all secondary service cells, the secondary service cell with the best channel quality, all cells, a cell having a channel quality, all service cell, the secondary service cell with the best channel quality, a primary service cell or a secondary service cell in the first secondary service node providing service for the terminal device.

10. The method according to claim 8, wherein the first event is:
a channel quality of a third cell of the first secondary service node being worse than or equal to a second predetermined value, and a channel quality of a fourth cell of the second secondary service node being better than or equal to a third predetermined value,
the third cell comprises all cells, a cell with the best channel quality, all service cells, a service cell with the best channel quality, a primary service cell or a secondary service cell of the first secondary service node; and
the fourth cell comprises at least one cell in the second secondary service node being able to provide service for the terminal device.

11. The method according to claim 7, wherein the first information indicates that the secondary service node that needs to be measured comprises a third secondary service node, wherein the third secondary service node is a node that is serving the terminal device;

the first information is further used to indicate to the terminal device a second event for triggering the measurement result reporting; and the second event is used to indicate that a channel quality of a service cell of the third secondary service node is better than or equal to a fourth predetermined value.

12. A terminal device comprising a processor, a transceiver and a memory, the memory is stored with program codes, and when the program codes are executed by the processor, the execution causes the terminal device to:

receive, by the transceiver, first information sent by a primary service node serving the terminal device in a first network, wherein the first information is used to indicate the terminal device to perform at least one of measurement or measurement result reporting on a secondary service node in a second network; and perform, by the processor, the at least one of the measurement or measurement result reporting on the secondary service node in the second network according to the first information, wherein the secondary service node in the second network is a network service node same as or different from that of the primary service node, wherein the first information indicates that the secondary service node on which the at least one of the measurement or the measurement result reporting needs to be performed comprises a fourth secondary service node, wherein the fourth secondary service node is a node that is serving the terminal device;

the first information is further used to indicate to the terminal device a third event for triggering the measurement result reporting; and the third event is used to indicate that a channel quality of a fifth cell of the fourth secondary service node is worse than or equal to a fifth predetermined value, wherein the fifth cell is all cells, a cell with a best channel quality, all service cells or a service cell with the best channel quality of the fourth secondary service node, wherein the first information performs one of the following:

comprises a first field, and the first field identifies at least one of a network to which the secondary service node corresponding to the first information belongs or a number of the secondary service nodes corresponding to the first information;

comprises a second field, and the second field identifies at least one of a network to which the secondary service node corresponding to the at least one of the measurement or the measurement result reporting belongs or a number of secondary service nodes that need to be measured; and carries at least one of a frequency identifier, a node identifier ID, a cell ID, or a network type of the secondary service node.

13. The terminal device according to claim 12, wherein the secondary service node corresponding to at least one of a single measurement or a single measurement result reporting indicated by the first information comprises at least a first secondary service node and a second secondary service node, the first secondary service node is a node that is serving the terminal device, and the second secondary service node is a node that is not serving the terminal device.

14. The terminal device according to claim 13, wherein the first information is further used to indicate to the terminal device a first event for triggering the measurement result reporting; and the first event is used to indicate to perform measurement result reporting in at least one case of:

a comparison result between the measurement results of the at least two secondary service nodes satisfies a triggering condition, and, comparison results respectively between the measurement results of the at least two secondary service nodes and predetermined values satisfy a triggering condition.

15. The terminal device according to claim 14, wherein the first event is:

a channel quality of a first cell of the second secondary service node being better than a channel quality of a second cell of the first secondary service node by at least a first predetermined value, wherein the first cell comprises at least one cell in the second secondary service node being able to provide service for the terminal device; and the second cell comprises all secondary service cells, the secondary service cell with the best channel quality, all cells, a cell having a channel quality, all service cell, the secondary service cell with the best channel quality, a primary service cell or a secondary service cell in the first secondary service node providing service for the terminal device.

16. The terminal device according to claim 14, wherein the first event is:

a channel quality of a third cell of the first secondary service node being worse than or equal to a second predetermined value, and a channel quality of a fourth cell of the second secondary service node being better than or equal to a third predetermined value, the third cell comprises all cells, a cell with the best channel quality, all service cells, a service cell with the best channel quality, a primary service cell or a secondary service cell of the first secondary service node; and the fourth cell comprises at least one cell in the second secondary service node being able to provide service for the terminal device.

17. The terminal device according to claim 12, wherein the first information indicates that the secondary service node that needs to be measured comprises a third secondary service node, wherein the third secondary service node is a node that is serving the terminal device;

the first information is further used to indicate to the terminal device a second event for triggering the measurement result reporting; and the second event is used to indicate that a channel quality of a service cell of the third secondary service node is better than or equal to a fourth predetermined value.

* * * * *